United States Patent
Buda et al.

(10) Patent No.: US 11,853,017 B2
(45) Date of Patent: Dec. 26, 2023

(54) MACHINE LEARNING OPTIMIZATION FRAMEWORK

(71) Applicant: International Business Machines Corporation, Armonk, NY (US)

(72) Inventors: Teodora Buda, Dublin (IE); Patrick Joseph O'Sullivan, Dublin (IE); Hitham Ahmed Assem Aly Salama, Dublin (IE); Lei Xu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1278 days.

(21) Appl. No.: 15/814,565

(22) Filed: Nov. 16, 2017

(65) Prior Publication Data
US 2019/0146424 A1  May 16, 2019

(51) Int. Cl.
*G05B 13/02* (2006.01)
*G06N 20/00* (2019.01)
*G06N 5/02* (2023.01)
*G06N 3/08* (2023.01)
*G06N 7/02* (2006.01)

(52) U.S. Cl.
CPC .......... *G05B 13/021* (2013.01); *G06N 20/00* (2019.01); *G06N 3/08* (2013.01); *G06N 5/02* (2013.01); *G06N 7/02* (2013.01)

(58) Field of Classification Search
CPC .......... G05B 13/021; G06N 5/02; G06N 7/02
See application file for complete search history.

(56) References Cited

U.S. PATENT DOCUMENTS

| | | | |
|---|---|---|---|
| 5,359,524 A | 10/1994 | Rohan | |
| 6,805,502 B2 | 10/2004 | Rai et al. | |
| 7,984,112 B2 * | 7/2011 | Huang | H04L 67/5681 710/36 |

(Continued)

FOREIGN PATENT DOCUMENTS

| | | |
|---|---|---|
| CN | 104407922 A | 3/2015 |
| CN | 105334831 A | 2/2016 |
| CN | 105677489 A | 6/2016 |

OTHER PUBLICATIONS

Salman Salloum, "Big data analytics on Apache Spark", 2016 (Year: 2016).*

(Continued)

*Primary Examiner* — Ann J Lo
*Assistant Examiner* — Van C Mang
(74) *Attorney, Agent, or Firm* — Amin, Turocy & Watson, LLP

(57) ABSTRACT

Techniques that facilitate machine learning optimization are provided. In one example, a system includes a computational resource component, a batch interval component, and a machine learning component. The computational resource component collects computational resource data associated with a group of computing devices that performs a machine learning process. The batch interval component determines, based on the computational resource data, batch interval data indicative of a time interval to collect data for the machine learning process. The machine learning component provides the batch interval data to the group of computing devices to facilitate execution of the machine learning process based on the batch interval data.

20 Claims, 12 Drawing Sheets

(56) References Cited

U.S. PATENT DOCUMENTS

| | | | | |
|---|---|---|---|---|
| 8,595,154 B2* | 11/2013 | Breckenridge | ........ | G06N 20/00 |
| | | | | 706/12 |
| 10,257,275 B1* | 4/2019 | Dirac | ................. | H04L 67/1097 |
| 10,348,810 B1* | 7/2019 | Florissi | ............... | H04L 67/2833 |
| 10,404,787 B1* | 9/2019 | Florissi | ................. | G06F 9/5083 |
| 2010/0161740 A1 | 6/2010 | Belew et al. | | |
| 2015/0170048 A1* | 6/2015 | Lin | ....................... | H04L 51/212 |
| | | | | 706/12 |

OTHER PUBLICATIONS

Nicholas D. Lane, "DeepX: A Software Accelerator for Low-Power Deep Learning Inference on Mobile Devices", 2016 (Year: 2016).*

* cited by examiner

MACHINE LEARNING OPTIMIZATION FRAMEWORK

BACKGROUND

The subject disclosure relates to machine learning, and more specifically, to optimizing a machine learning framework.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate group patching recommendation and/or remediation with risk assessment are described.

According to an embodiment, a system can comprise a computational resource component, a batch interval component, and a machine learning component. The computational resource component can collect computational resource data associated with a group of computing devices that performs a machine learning process. The batch interval component can determine, based on the computational resource data, batch interval data indicative of a time interval to collect data for the machine learning process. The machine learning component can provide the batch interval data to the group of computing devices to facilitate execution of the machine learning process based on the batch interval data.

According to another embodiment, a computer-implemented method is provided. The computer-implemented method can comprise collecting, by a system operatively coupled to a processor, computational resource data associated with a group of computing devices that performs a machine learning process. The computer-implemented method can also comprise determining, by the system and based on the computational resource data, batch interval data indicative of a time interval to collect data for the machine learning process. Furthermore, the computer-implemented method can comprise providing, by the system, the batch interval data to the group of computing devices to facilitate execution of the machine learning process based on the batch interval data.

According to yet another embodiment, a computer program product for facilitating optimized machine learning can comprise a computer readable storage medium having program instructions embodied therewith. The program instructions can be executable by a processor and cause the processor to collect, by the processor, computational resource data associated with a group of computing devices that performs a machine learning process. The program instructions can also cause the processor to determine, by the processor, batch interval data based on the computational resource data, wherein the batch interval data is indicative of a time interval to collect data for the machine learning process. Furthermore, the program instructions can cause the processor to modify, by the processor, the machine learning process performed by the group of computing devices based on the batch interval data.

DETAILED DESCRIPTION

Figure 1:
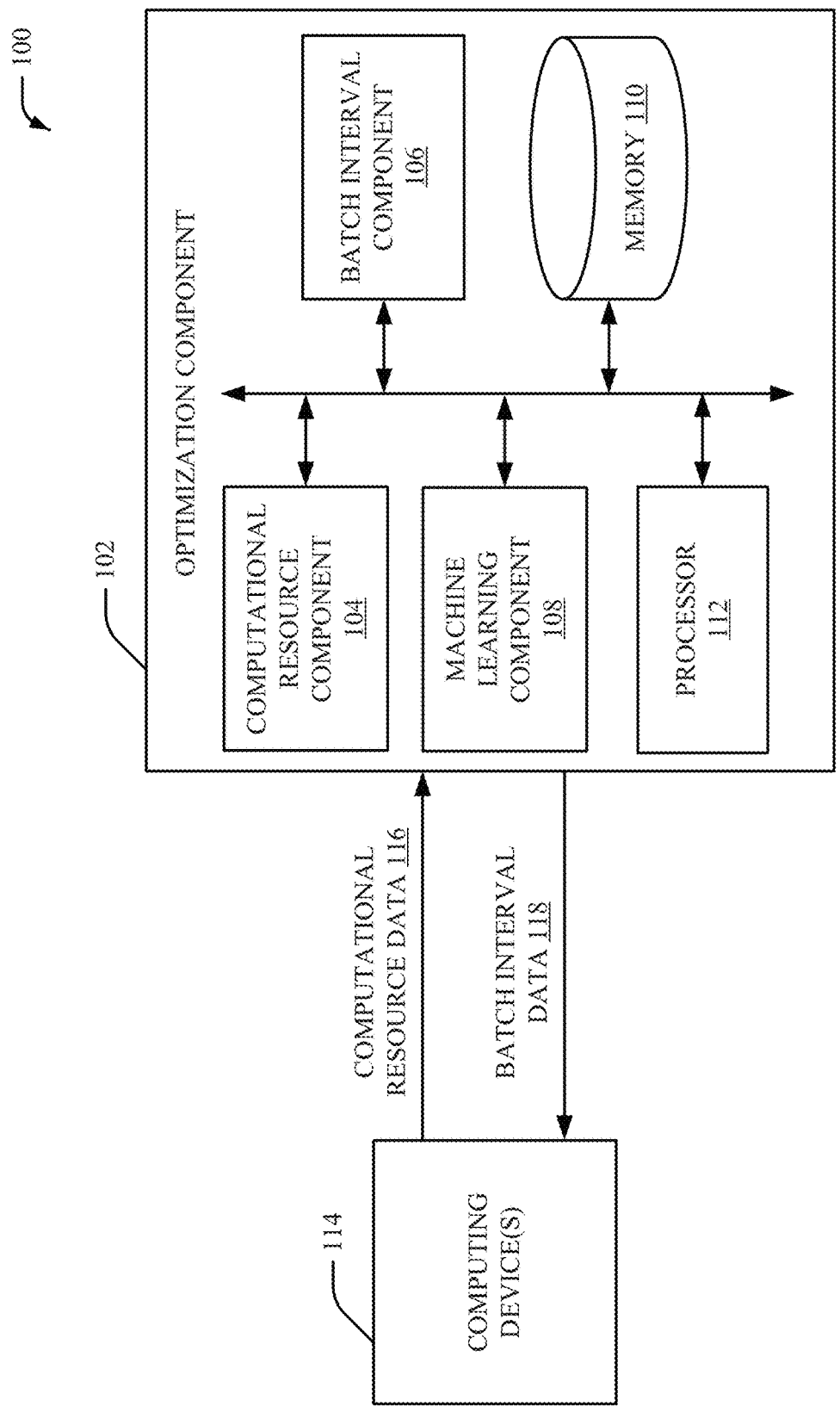
FIG. 1 illustrates a block diagram of an example, non-limiting system that includes an optimization component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Cloud platform systems are becoming increasingly complex. Generally, fulfillment of an operation executed by a cloud platform system is performed based on a collaboration between numerous computing devices (e.g., loosely coupled computing devices). Misbehavior of any single computing device can cause failure of the operation and/or can result in the cloud platform system becoming inoperable. As a result, monitoring tools can be employed to monitor a cloud platform system that includes numerous computing devices. For instance, a log analytics system can be employed to collect and/or analyze computer-generated data (e.g., logs) generated by computing devices. Furthermore, metrics associated with the computer-generated data can be determined by a log analytics system. In one example, a log analytics system can determine how frequent a particular type of computer-generated data is generated by computing devices. However, the computer-generated data is generally analyzed by the log analytics system as unprocessed and/or unstructured computer-generated data. As such, analyzing the computer-generated data is generally computationally expensive, time consuming and/or difficult to perform.

Batch learning is a process for executing a machine learning process (e.g., one or more machine learning algorithms) on a computer or a cluster of computers. A machine learning process associated with batch learning can be executed without manual intervention. In an example, a machine learning process associated with batch learning can receive a data set, processes the data set, and produce one or more outputs. Periodically, input data can be collected into batches for processing. A time interval for the collection of the input data is a batch interval or a batch window. However, batch intervals for existing batch-based machine learning systems are generally manually specified. As such, existing batch-based machine learning systems are generally error-prone and time consuming. Moreover, existing batch-based machine learning systems generally cannot adapt to variance of workload and/or available resources for a system. As such, it is desirable to improve batch-based machine learning systems.

Embodiments described herein include systems, computer-implemented methods, and computer program products that facilitate a machine learning optimization framework. For example, an improved machine learning system (e.g., an improved batch-based machine learning system) can be provided. In an aspect, a batch interval for a machine learning system can be autonomously estimated based on system state and/or specific tasks associated with the machine learning system. For instance, a batch interval for a machine learning system can be autonomously estimated by autonomously adapting to variation of computational resources, machine learning models, data patterns, and/or system requirements. In an embodiment, computational resource information from nodes of a group of computing devices can be collected. The group of computing devices can perform one or more machine learning processes. The computational resource information can include, for example, information from one or more processors associated with the group of computing devices, information from memory associated with the group of computing devices, information from data storage associated with the group of computing devices, information regarding network bandwidth associated with the group of computing devices, etc. Based on the computational resource information from the nodes of the group of computing devices, a batch interval can be estimated. Furthermore, the batch interval can be provided to the group of computing devices. For example, the batch interval can be provided to the one or more machine learning processes executed by the group of computing devices. In certain embodiments, the batch interval can be recorded and/or state information associated with the group of computing devices can be collected in response to the batch interval being provided to the group of computing devices. In another embodiment, the batch interval can be re-estimated in response to a determination that a state of the group of computing devices satisfies a defined criterion and/or that a user request is received to re-estimate the batch interval. As such, a group of computing devices and/or one or more machine learning processes executed by a group of computing devices can be improved. For instance, performance of a group of computing devices can be improved, processing performance (e.g., processing characteristics) of a group of computing devices can be improved, efficiency of a group of computing devices can be improved, and/or power characteristics of a group of computing devices can be improved. Additionally or alternatively, performance of one or more machine learning processes executed by a group of computing devices can be improved, accuracy of information generated by one or more machine learning processes executed by a group of computing devices can be improved, efficiency of one or more machine learning processes executed by a group of computing devices can be improved, and/or processing characteristics of one or more machine learning processes executed by a group of computing devices can be improved.

FIG. 1 illustrates a block diagram of an example, non-limiting system 100 that facilitates a machine learning optimization framework in accordance with one or more embodiments described herein. In various embodiments, the system 100 can be a machine learning system associated with technologies such as, but not limited to, machine learning technologies, artificial intelligence technologies, batch learning technologies, computer technologies, server technologies, information technologies, digital technologies, data analysis technologies, data classification technologies, data clustering technologies, medical device technologies, filtering technologies, recommendation system technologies, signal processing technologies, image processing technologies, video processing technologies, audio processing technologies, and/or other digital technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with an optimization component, etc.) for carrying out defined tasks related to machine learning, batch learning and/or batch interval optimization. The system 100 and/or components of the system can be employed to solve new problems that arise through advancements in technologies mentioned above, employment of machine learning, and/or computer architecture, and the like. One or more embodiments of the system 100 can provide technical improvements to machine learning systems, artificial intelligence systems, batch learning systems, computer systems, server systems, information systems, digital systems, data analysis systems, data classification systems, data clustering systems, medical device systems, filtering systems, recommendation systems, signal processing systems, image processing systems, video processing systems, audio processing systems, and/or other systems. One or more embodiments of the system 100 can also provide technical improvements to a processing unit (e.g., a group of computing devices) associated with a machine learning process by improving processing performance of the processing unit, improving processing efficiency of the processing unit, and/or reducing an amount of time for the processing unit to perform a machine learning process.

In the embodiment shown in FIG. 1, the system 100 can include an optimization component 102. As shown in FIG. 1, the optimization component 102 can include a computational resource component 104, a batch interval component 106, and a machine learning component 108. Aspects of the optimization component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the optimization component 102 can also include memory 110 that stores computer executable components and instructions. Furthermore, the optimization component 102 can include a processor 112 to facilitate execution of the instructions (e.g., computer executable components and corresponding instructions) by the optimization component 102. As shown, the computational resource component 104, the batch interval component 106, the machine learning component 108, the memory 110 and/or the processor 112 can be electrically and/or communicatively coupled to one another in one or more embodiments.

Additionally, in certain embodiments, the system 100 can also include one or more computing devices 114. The one or more computing devices 114 can be a group of computing devices 114 that execute one or more machine learning processes based on a batch interval. Furthermore, the one or more computing devices 114 can be in communication with the optimization component 102 to facilitate optimization of the batch interval for the one or more machine learning processes executed by the one or more computing devices 114. A computing device from the one or more computing devices 114 can be a hardware device that includes one or more processors. For instance, a computing device from the one or more computing devices 114 can include an electronic device, a network device, a server device, a cloud device and/or another type of device that executes one or more machine learning processes using one or more processors. In an aspect, the optimization component 102 can receive computational resource data 116. The computational resource data 116 can be associated with the one or more computing devices 114. In one example, the computational resource data 116 can be received from the one or more computing devices 114. In another example, the computational resource data 116 can be determined by analyzing and/or monitoring the one or more computing devices 116. The computational resource data 116 can include, for example, information associated with one or more processors (e.g., one or more central processing units) from the one or more computing devices 114, memory from the one or more computing devices 114, data storage from the one or more computing devices 114, network bandwidth of the one or more computing devices 114, and/or other computational resources from the one or more computing devices 114. For example, the computational resource data 116 can include processing data indicative of processing information from one or more processors associated with the one or more computing devices 114 that perform the one or more machine learning processes. In another example, the computational resource data 116 can include memory data indicative of memory information from one or more memory devices associated with the one or more computing devices 114 that perform the one or more machine learning processes. In yet another example, the computational resource data 116 can include network data indicative of network bandwidth information associated with the one or more computing devices 114 that perform the one or more machine learning processes.

In certain embodiments, the computational resource data 116 can be determined based on one or more machine learning techniques. For example, the computational resource component 104 can employ principles of artificial intelligence to facilitate obtaining the computational resource data 116. The computational resource component 104 can perform learning with respect to the one or more computing devices 114 explicitly or implicitly. In an aspect, the computational resource component 104 can determine and/or obtain the computational resource data 116 based on classifications, correlations, inferences and/or expressions associated with principles of artificial intelligence. For instance, the computational resource component 104 can employ an automatic classification system and/or an automatic classification process to determine and/or obtain the computational resource data 116 associated with the one or more computing devices 114. In one example, the computational resource component 104 can employ a probabilistic and/or statistical-based analysis (e.g., factoring into the analysis utilities and costs) to learn and/or generate inferences with respect to the one or more computing devices 114. In an aspect, the computational resource component 104 can include an inference component (not shown) that can further enhance automated aspects of the computational resource component 104 utilizing in part inference based schemes to facilitate determining and/or obtaining the computational resource data 116 associated with the one or more computing devices 114. The computational resource component 104 can employ any suitable machine-learning based techniques, statistical-based techniques and/or probabilistic-based techniques. For example, the computational resource component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the computational resource component 104 can perform a set of machine learning computations associated with obtaining and/or determining the computational resource data 116 associated with the one or more computing devices 114. For example, the computational resource component 104 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to obtain and/or determine the computational resource data 116 associated with the one or more computing devices 114.

Based on the computational resource data 116, the optimization component 102 can generate batch interval data 118. The batch interval data 118 can be provided to the one or more computing devices 114. For example, the batch interval data 118 can be employed by the one or more machine learning processes executed by the one or more computing devices 114. The batch interval data 118 can include a batch interval for the one or more machine learning processes executed by the one or more computing devices 114. For instance, batch interval data 118 can be indicative of a time interval to collect data for the one or more machine learning processes executed by the one or more computing devices 114. In an embodiment, the computational resource component 104 can collect the computational resource data 116 associated with the one or more computing devices 114 that perform the one or more machine learning process. The batch interval component 106 can determine, based on the computational resource data 116, the batch interval data 118. Furthermore, the machine learning component can provide the batch interval data 118 to the one or more computing devices 114 to facilitate execution of the one or more machine learning process based on the batch interval data 118.

In certain embodiments, the computational resource component 104 can collect the processing data of the computational resource data 116 from the one or more processors associated with the one or more computing devices 114. Furthermore, the batch interval component 106 can determine the batch interval data 118 based on the processing data of the computational resource data 116. Additionally or alternatively, the computational resource component 104 can collect memory data of the computational resource data 116 from the one or more processors associated with the one or more computing devices 114. Furthermore, the batch interval component 106 can determine the batch interval data 118 based on the memory data of the computational resource data 116. Additionally or alternatively, the computational resource component 104 can collect network data of the computational resource data 116 from the one or more processors associated with the one or more computing devices 114. Furthermore, the batch interval component 106 can determine the batch interval data 118 based on the network data of the computational resource data 116.

In an embodiment, the batch interval component 106 can update the batch interval data 118 provided to the one or more computing devices 114. In one example, the batch interval component 106 can re-estimate the batch interval data 118 (e.g., to generate an updated version of the batch interval data 118) for the one or more machine learning processes executed by the one or more computing devices 114 based on a determination that the one or more computing devices 114 satisfy a defined criterion. The defined criterion for the one or more computing devices 114 can be related to a state of the one or more computing devices 114. For instance, the batch interval component 106 can re-estimate the batch interval data 118 (e.g., to generate an updated version of the batch interval data 118) for the one or more machine learning processes executed by the one or more computing devices 114 based on a determination that a state of the one or more computing devices 114 has changed by a defined amount or to a defined state. In another example, the batch interval component 106 can re-estimate the batch interval data 118 (e.g., to generate an updated version of the batch interval data 118) for the one or more machine learning processes executed by the one or more computing devices 114 in response to a control signal received from an electronic device that monitors the one or more computing devices 114. The electronic device can be an electronic device can be an electronic device that includes a display such as, for example, a computing device with a display, a computer, a desktop computer, a laptop computer, a monitor device, a smart device, a smart phone, a mobile device, a handheld device, a tablet, a wearable device, a portable computing device or another type of device associated with a display. Alternatively, the electronic device can be an electronic device without an electronic device such as, for example, a controller, etc.

In certain embodiments, the batch interval component 106 can determine the batch interval data 118 based on one or more patterns associated with data collected for the one or more machine learning process executed by the one or more computing devices 114. For example, the batch interval component 106 can monitor the one or more computing devices 114 to determine one or more patterns associated with data collected for the one or more machine learning process executed by the one or more computing devices 114. The batch interval component 106 can also generate the batch interval data 118 based on the one or more patterns. In certain embodiments, the batch interval component 106 can determine the batch interval data 118 based on the computational resource data 116 and latency data indicative of a set of latency requirements for one or more computing devices 114. For example, the latency requirements can indicate that a sum of a batch interval and a batch processing time for the one or more machine learning process executed by the one or more computing devices 114 is less than a latency threshold value. In certain embodiments, the batch interval component 106 can determine the batch interval data 118 based on the computational resource data 116 and historical data associated with the one or more computing devices 114. The historical data can be associated with previously determined computation resource data for the one or more computing devices 114 and/or other information associated with the one or more computing devices 114 that is determined prior to receiving the computational resource data 116.

In certain embodiments, the batch interval data 118 can be determined based on one or more machine learning techniques. For example, the batch interval component 106 can employ principles of artificial intelligence to determine the batch interval data 118. The batch interval component 106 can perform learning with respect to the batch interval data 118 explicitly or implicitly. In an aspect, the batch interval component 106 can determine the computational resource data 116 based on classifications, correlations, inferences and/or expressions associated with principles of artificial intelligence. For instance, the batch interval component 106 can employ an automatic classification system and/or an automatic classification process to determine the batch interval data 118. In one example, the batch interval component 106 can employ a probabilistic and/or statistical-based analysis (e.g., factoring into the analysis utilities and costs) to learn and/or generate inferences with respect to the batch interval data 118. In an aspect, batch interval component 106 can include an inference component (not shown) that can further enhance automated aspects of the batch interval component 106 utilizing in part inference based schemes to facilitate determining the batch interval data 118. The batch interval component 106 can employ any suitable machine-learning based techniques, statistical-based techniques and/or probabilistic-based techniques. For example, the computational resource component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the batch interval component 106 can perform a set of machine learning computations associated with determining the batch interval data 118. For example, the batch interval component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to determine the batch interval data 118.

It is to be appreciated that the optimization component 102 (e.g., the computational resource component 104, the batch interval component 106 and/or the machine learning component 108) performs a batch learning process associated with determining a batch interval that cannot be performed by a human (e.g., is greater than the capability of a single human mind). For example, an amount data processed, a speed of processing of data and/or data types processed by the optimization component 102 (e.g., the computational resource component 104, the batch interval component 106 and/or the machine learning component 108) over a certain period of time can be greater, faster and different than an amount, speed and data type that can be processed by a single human mind over the same period of time. The optimization component 102 (e.g., the computational resource component 104, the batch interval component 106 and/or the machine learning component 108) can also be fully operational towards performing one or more other functions (e.g., fully powered on, fully executed, etc.) while also performing the above-referenced batch learning process. Moreover, the batch interval data 118 generated by the optimization component 102 (e.g., the computational resource component 104, the batch interval component 106 and/or the machine learning component 108) can include information that is impossible to obtain manually by a user.

Figure 2:
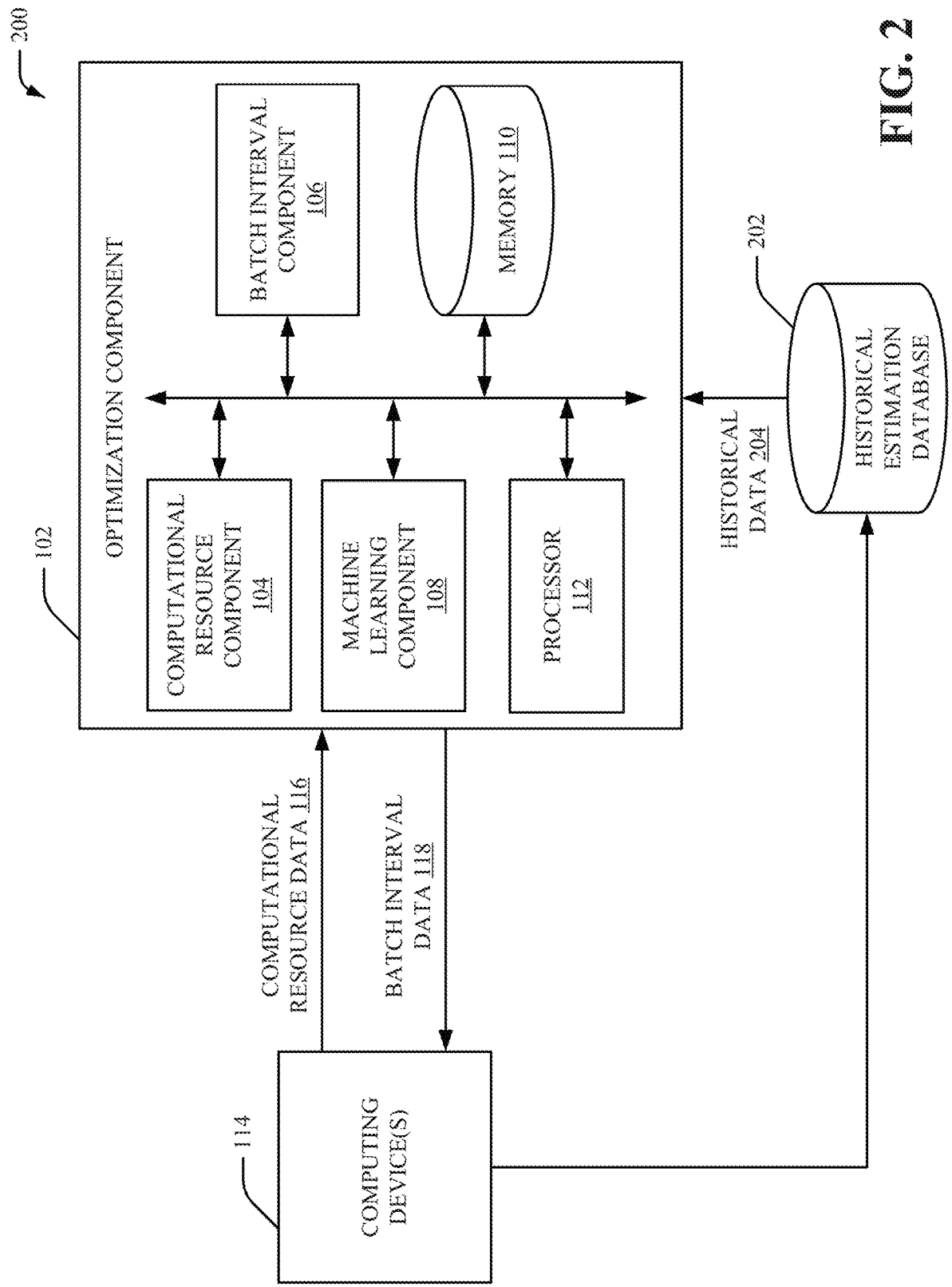
FIG. 2 illustrates a block diagram of another example, non-limiting system that includes an optimization component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the optimization component 102 and a historical estimation database 202. The optimization component 102 can include the computational resource component 104, the batch interval component 106, and the machine learning component 108. In an embodiment, the historical estimation database 202 can store the historical data 204 associated with the one or more computing devices 114. For instance, the historical data 204 can include historical estimation records of computational resources associated with the one or more computing devices 114. In one example, the historical data 204 can include historical resource data for the one or more computing devices that is determined prior to the computational resource data 116. In an example, the historical data 204 can include information regarding a type of data obtained from computational resources of the one or more computing devices 114. Additionally or alternatively, the historical data 204 can include information regarding a time interval for processing by computational resources of the one or more computing devices 114. The historical data 204 can be provided to the optimization component 102. In an aspect, the batch interval component can determine the batch interval data 118 based on the computational resource data 116 and the historical data 204. For example, the batch interval component 106 can determine the batch interval data 118 based on the historical data 204 and the processing data of the computational resource data 116. Additionally or alternatively, the batch interval component 106 can determine the batch interval data 118 based on the historical data 204 and the memory data of the computational resource data 116. Additionally or alternatively, the batch interval component 106 can determine the batch interval data 118 based on the historical data 204 and the network data of the computational resource data 116.

Figure 3:
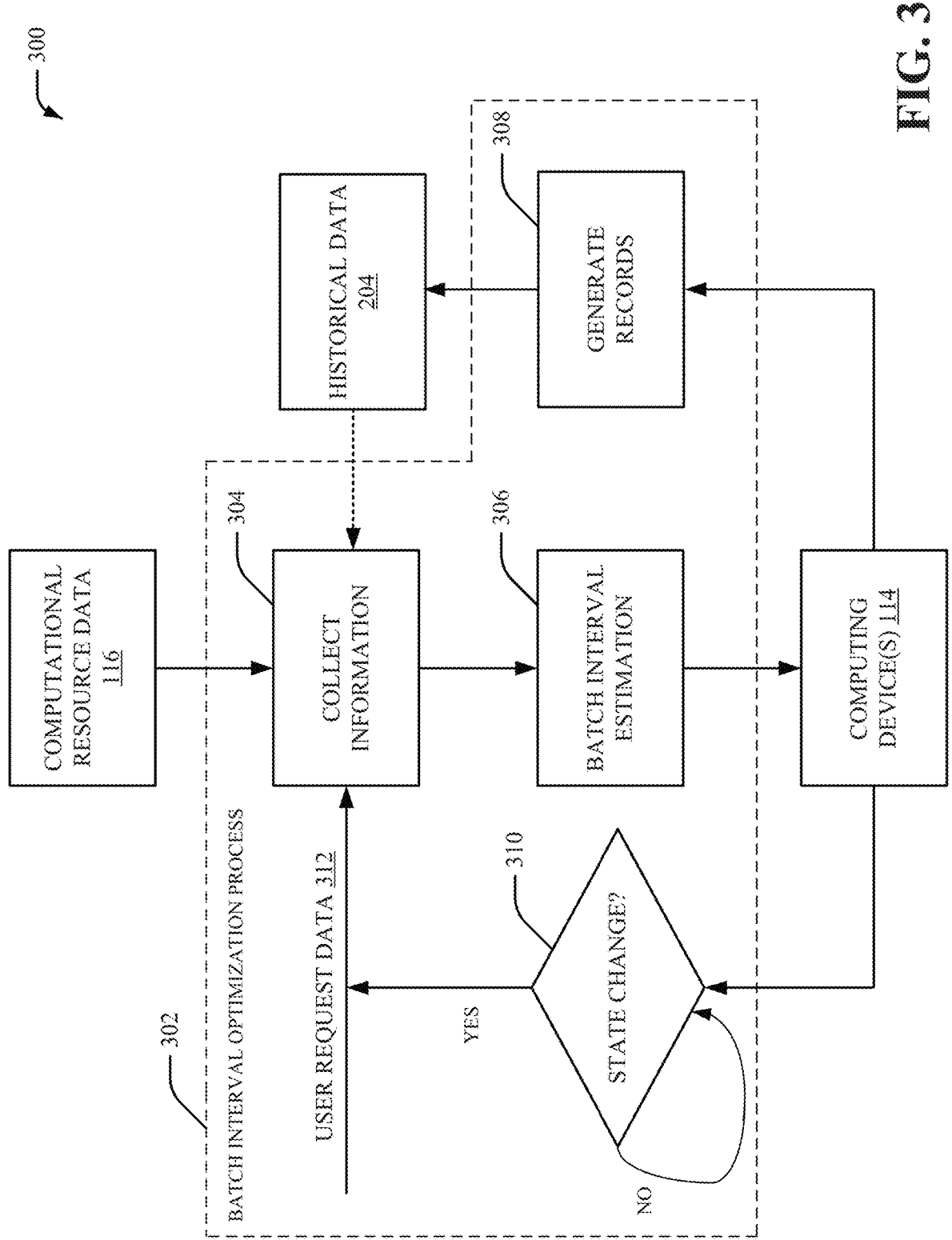
FIG. 3 illustrates a block diagram of an example, non-limiting system that includes a batch interval optimization process in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes a batch interval optimization process 302. The batch interval optimization process 302 can be an optimization process performed by the optimization component 102. In an aspect, the batch interval optimization process 302 can collect information at step 304. For example, the batch interval optimization process 302 can receive the computational resource data 116 at the step 304. In certain embodiments, the batch interval optimization process 302 can also receive the historical data 204 at the step 304. Based on the information collected at step 304, the batch interval optimization process 302 can perform batch interval estimation at step 306. For example, based on the computational resource data 116 and/or the historical data 204, the batch interval optimization process 302 can perform the batch interval estimation at the step 306. In an aspect, the batch interval data 118 can be generated by performing the batch interval estimation at the step 306. Furthermore, the batch interval data 118 can be provided to the one or more computing devices 114 during the performing the batch interval estimation at the step 306. In certain embodiments, historical computational resource data associated with the one or more computing devices 114 that is generated prior to the computational resource data 116 can be employed to generate records at step 308. For example, the historical data 204 can include records generated at the step 308. In certain embodiments, the batch interval optimization process 302 can monitor the one or more computing devices 114. In an aspect, the batch interval optimization process 302 can determine whether a state change has occurred for the one or more computing devices 114 at step 310. For example, the batch interval optimization process 302 can determine whether a state of the one or more computing has changed and/or satisfies a defined criterion at the step 310. If yes, the batch interval optimization process 302 can collect information at the step 304. If no, the batch interval optimization process 302 can continue monitoring the one or more computing devices 114. In certain embodiments, the collection of the information at the step 304 can be initiated in response to user request data 312. For example, in certain embodiments, a user can request initiation of the batch interval optimization process 302.

Figure 4:
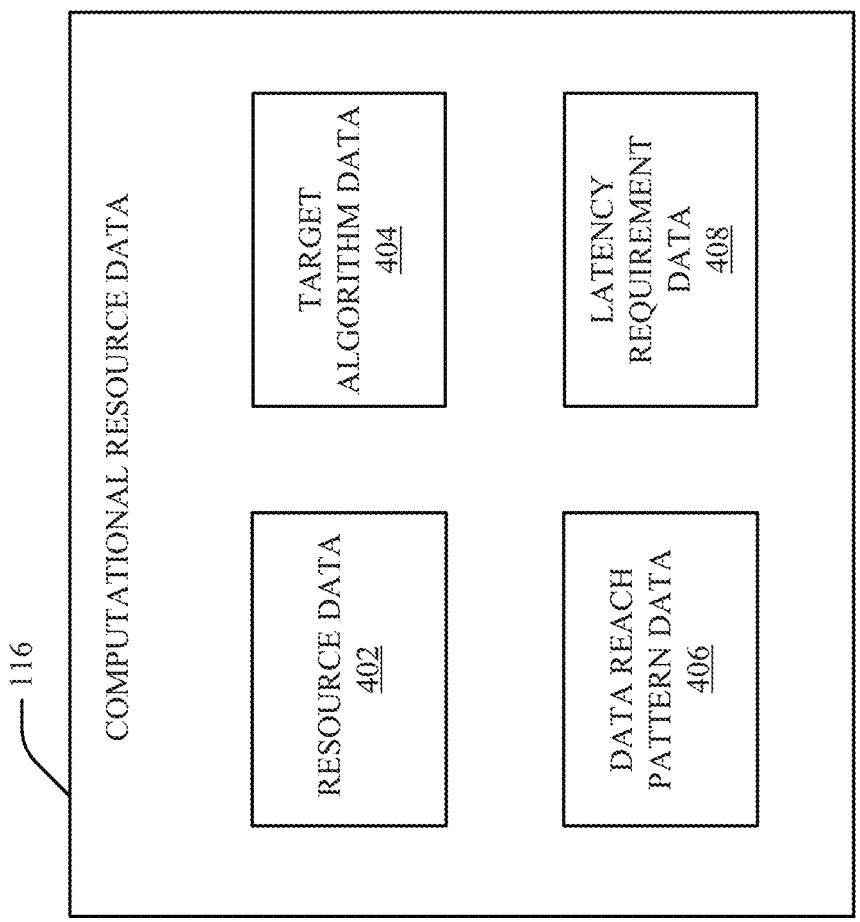
FIG. 4 illustrates example, non-limiting computational resource data in accordance with one or more embodiments described herein.

FIG. 4 illustrates a block diagram of an example, non-limiting computational resource data 116 in accordance with one or more embodiments described herein. Repetitive description of like elements employed in other embodiments described herein is omitted for sake of brevity.

The computational resource data 116 can include resource data 402, target algorithm data 404, data reach pattern data 406 and/or latency requirement data 408. The resource data 402 can include information associated with one or more resources for the one or more computing devices 114. For instance, the resource data 402 can include information associated with one or more processors (e.g., one or more central processing units) from the one or more computing devices 114, memory from the one or more computing devices 114, data storage from the one or more computing devices 114, network bandwidth of the one or more computing devices 114, and/or other computational resources from the one or more computing devices 114. In an example, the resource data 402 can include processing data indicative of processing information from one or more processors associated with the one or more computing devices 114 that perform the one or more machine learning processes. In another example, the resource data 402 can include memory data indicative of memory information from one or more memory devices associated with the one or more computing devices 114 that perform the one or more machine learning processes. In yet another example, the resource data 402 can include network data indicative of network bandwidth information associated with the one or more computing devices 114 that perform the one or more machine learning processes.

The target algorithm data 404 can include information associated with one or more target algorithms that are employed to determine the resource data 402. The one or more target algorithms can be one or more machine learning algorithms that are employed to determine the resource data 402. In one example, the target algorithm data 404 can include a type of algorithm being employed to determine the resource data 402. In another example, the target algorithm data 404 can include timing data associated with the algorithm being employed to determine the resource data 402. For instance, the target algorithm data 404 can include an amount of time that the algorithm takes to execute one or more tasks associated with determining the resource data 402. The data reach pattern data 406 can include one or more patterns associated with data obtained by the algorithm that determines the resource data 402. For example, the data reach pattern data 406 can include information regarding how often data is collected by the algorithm that determines the resource data 402. In another example, the data reach pattern data 406 can include a number of features associated with the data that is collected by the algorithm that determines the resource data 402. In yet example, the data reach pattern data 406 can include information regarding a size of data collected by the algorithm that determines the resource data 402. The latency requirement data 408 can include one or more latency requirements for the algorithm that determines the resource data 402. For example, latency requirement data 408 can include a maximum latency allowed by the algorithm that determines the resource data 402.

Figure 5:
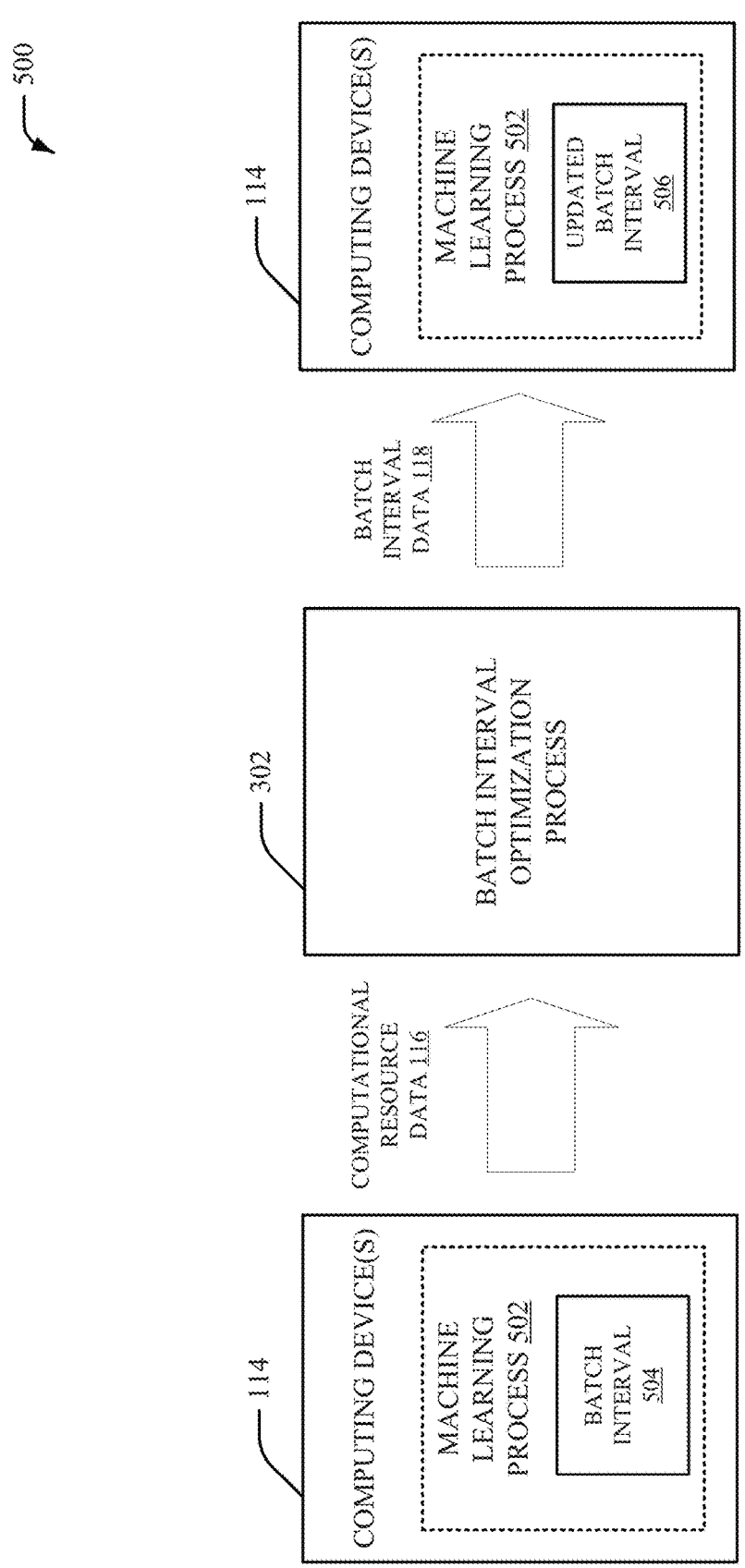
FIG. 5 illustrates a block diagram of another example, non-limiting system that includes a batch interval optimization process in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 can include the one or more computing devices 114 and the batch interval optimization process 302. The one or more computing devices 114 can execute a machine learning process 502. The machine learning process 502 can be associated with a batch interval 504. For example, the batch interval 504 can be a time interval for collection of data associated with the machine learning process 502. The batch interval optimization process 302 can be associated with the optimization component 102. In an embodiment, the batch interval optimization process 302 can employ the computational resource data 116 to generate the batch interval data 118. In certain embodiments, the batch interval optimization process 302 can additionally employ the historical data 204 to generate the batch interval data 118. The batch interval data 118 can include, for example, an updated batch interval 506. The updated batch interval 506 can be an optimized version of the batch interval 504. Furthermore, the batch interval 504 employed by the machine learning process 502 can be replaced with the updated batch interval 506. As such, efficiency of the machine learning process 502 and/or performance of the one or more computing devices can be improved.

Figure 6:
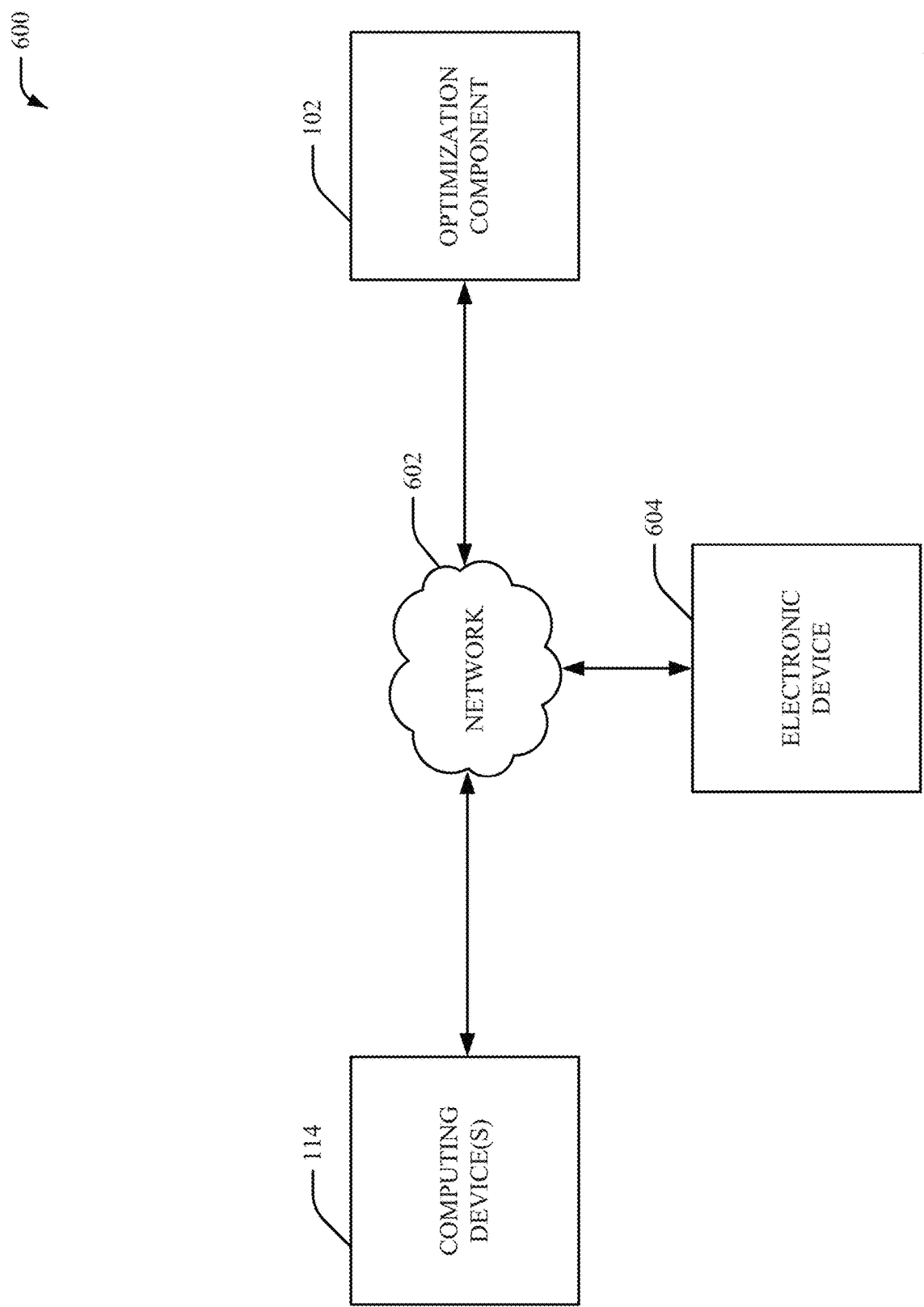
FIG. 6 illustrates a block diagram of an example, non-limiting system to facilitate machine learning optimization in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 can include the one or more computing devices 114, the optimization component 102 and a network 602. The one or more computing devices 114 can be in communication with the optimization component 102 via the network 602. The network 116 can include one or more networks. For example, the network 116 can include one or more wireless networks and/or one or more wired networks, including but not limited to, a wide area network (WAN, e.g., the Internet), a local area network (LAN) and/or a cellular network. The network 116 can also include one or more network devices (e.g., network hardware, network equipment, computer networking devices, etc.) to facilitate communication and/or interaction between at least the one or more computing devices 114 and the optimization component 102. In certain embodiments, the one or more computing devices 114 and/or the optimization component 102 can be in communication with an electronic device 604 via the network 602. The electronic device 604 can be, for example, a computing device, a controller, a computer, a desktop computer, a laptop computer, a monitor device, a smart device, a smart phone, a mobile device, a handheld device, a tablet, a wearable device, a portable computing device or another type of device.

In an embodiment, the electronic device 604 can monitor the one or more computing devices 114. Furthermore, the electronic device 604 can send information to the optimization component 102 based on monitoring of the one or more computing devices 114. In an aspect, the electronic device 604 can determine whether a state change has occurred for the one or more computing devices 114. For example, the optimization component 102 can transmit the batch interval data 118 to the one or more computing devices 114 via the network 602. Furthermore, the electronic device 604 can monitor the one or more computing devices 114 in response to the batch interval data 118 being employed by one or more machine learning processes (e.g., the machine learning process 502) executed by the one or more computing devices 114. In response to a state of the one or more computing devices 114 being altered and/or satisfying a defined criterion for the state, the electronic device 604 can transmit a control signal to the optimization component 102. In an aspect, the optimization component 102 (e.g., the batch interval component 106) can determine updated batch interval data for one or more machine learning processes (e.g., the machine learning process 502) executed by the one or more computing devices 114 in response to receiving the control signal from the electronic device 604.

Figure 7:
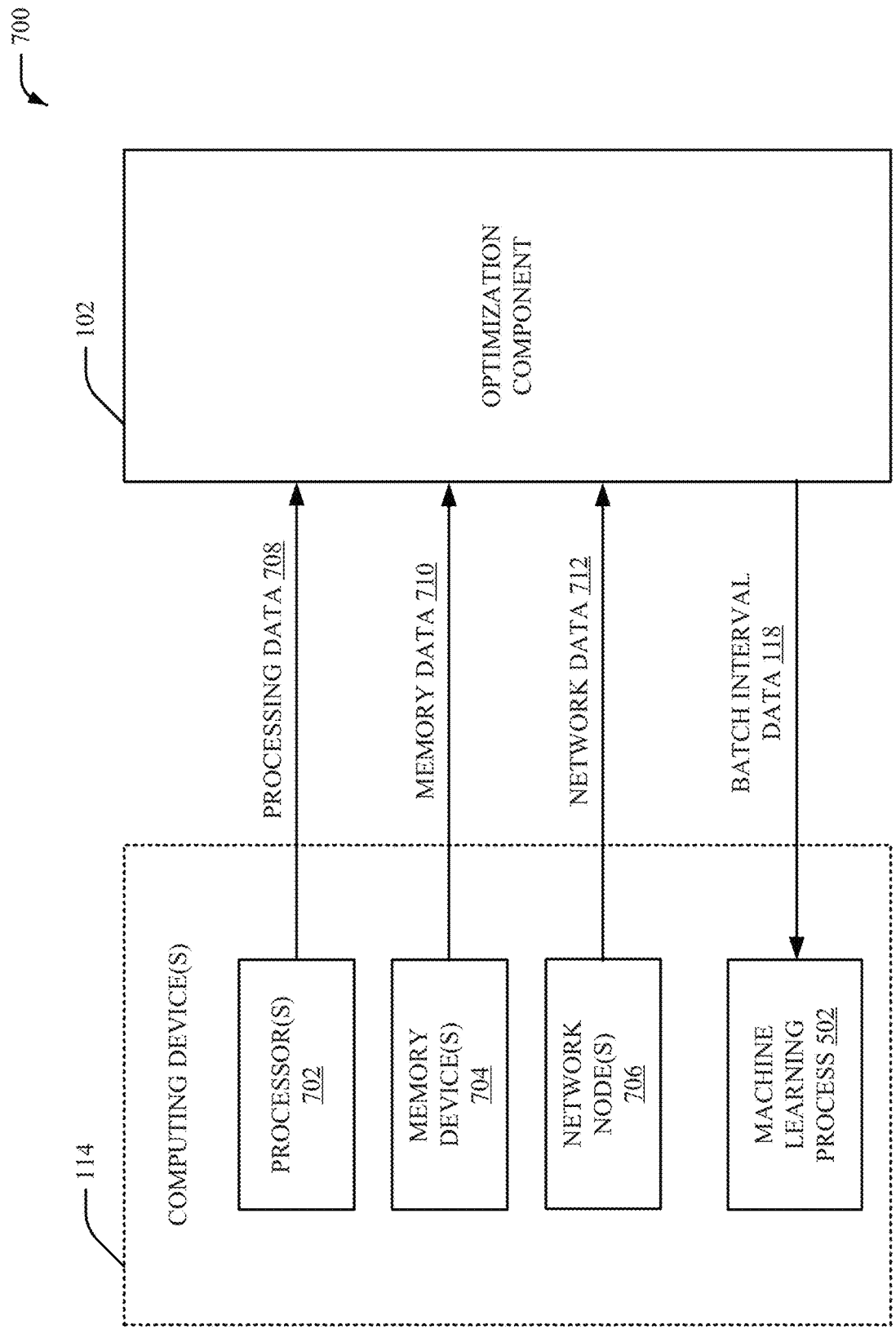
FIG. 7 illustrates a block diagram of another example, non-limiting system to facilitate machine learning optimization in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 can include the one or more computing devices 114 and the optimization component 102. The one or more computing devices 114 can include one or more processors 702, one or more memory devices 704, and/or one or more network nodes 706. The one or more processors 702 can execute one or more machine learning processes associated with the one or more computing devices 114. For example, the one or more processors 702 can execute the machine learning process 502. Furthermore, the one or more memory devices 704 can store data generated by the one or more machine learning processes (e.g., the machine learning process 502) executed by the one or more processors 702. The one or more network nodes 706 can constitute a computing cluster formed by the one or more computing devices 114. In an embodiment, the optimization component 102 can receive processing data 708 associated with the one or more processors 702. The processing data can be indicative of processing information from the one or more processors 702. Additionally or alternatively, the optimization component 102 can receive memory data 710 associated with the one or more memory devices 704. The memory data 710 can be indicative of memory information from the one or more memory devices 704. Additionally or alternatively, the optimization component 102 can receive network data 712 associated with the one or more network nodes 706. The network data 712 can be indicative of network bandwidth information associated with the one or more network nodes 706. In an embodiment, the processing data 708, the memory data 710 and/or the network data 712 can be included in the computational resource data 116. For example, the processing data 708, the memory data 710 and/or the network data 712 can be included in the resource data 402 of the computational resource data 116. Based on the processing data 708, the memory data 710 and/or the network data 712, the optimization component 102 can generate the batch interval data 118. The batch interval data 118 can be provided to the machine learning process 502 associated with the one or more computing devices 114. For example, the machine learning process 502 can be performed based on the batch interval data 118.

Figure 8:
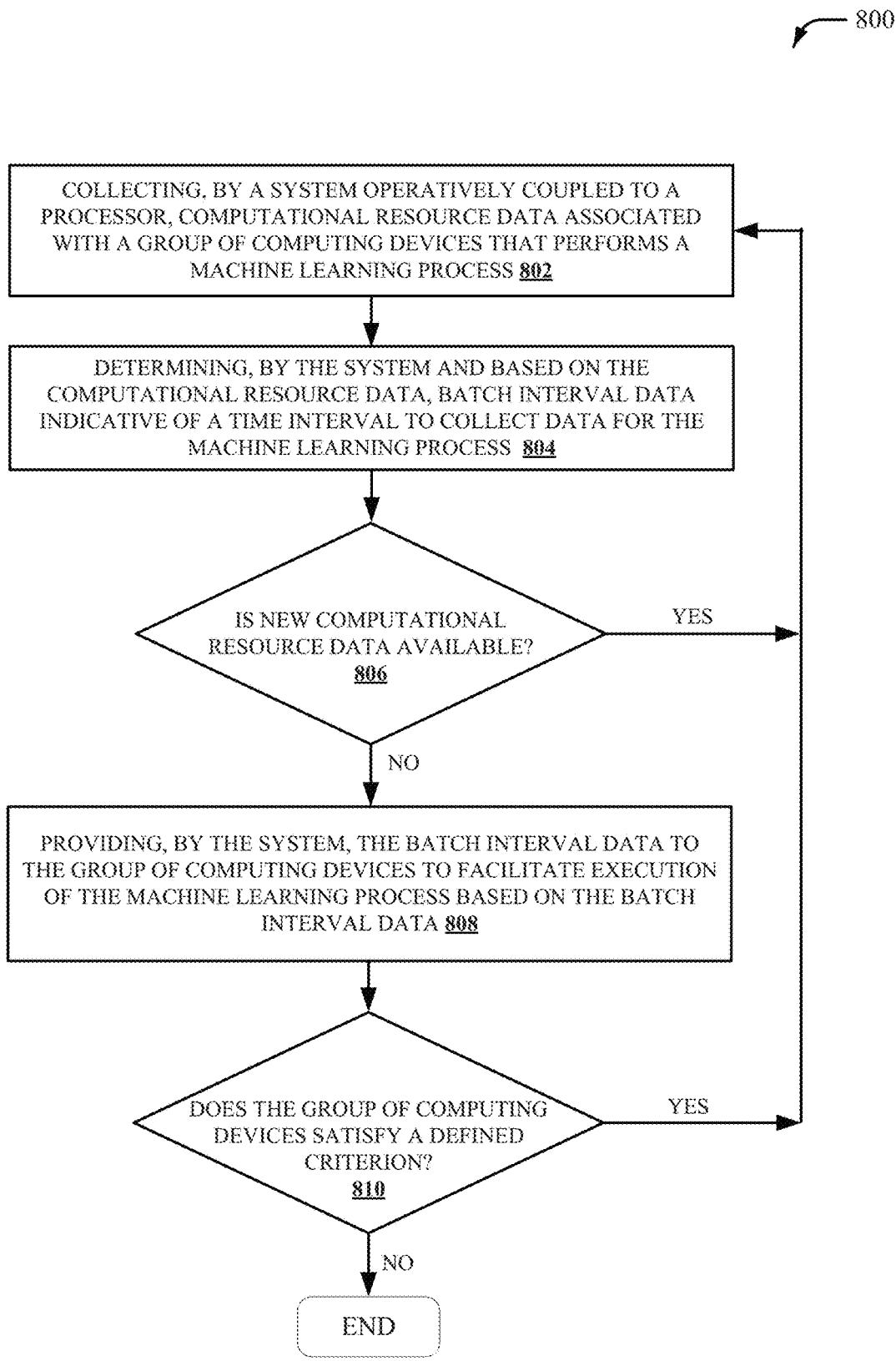
FIG. 8 illustrates a flow diagram of an example, non-limiting computer-implemented method for facilitating machine learning optimization in accordance with one or more embodiments described herein.

FIG. 8 illustrates a flow diagram of an example, non-limiting computer-implemented method 800 that facilitates machine learning optimization in accordance with one or more embodiments described herein. At 802, computational resource data associated with a group of computing devices that performs a machine learning process is collected by a system operatively coupled to a processor (e.g., by computational resource component 104). The computational resource data can include, for example, information associated with one or more processors (e.g., one or more central processing units) from the group of computing devices, memory from the group of computing devices, data storage from the group of computing devices, network bandwidth of the group of computing devices, and/or other computational resources from the group of computing devices. For example, the computational resource data can include processing data indicative of processing information from one or more processors associated with the group of computing devices that performs the machine learning process. Additionally or alternatively, the computational resource data can include memory data indicative of memory information from a group of memory devices associated with the group of computing devices that performs the machine learning process. In yet another example, the computational resource data can include network data indicative of network bandwidth information associated with the group of computing devices that performs the machine learning process.

At 804, batch interval data indicative of a time interval to collect data for the machine learning process is determined by the system (e.g., by batch interval component 106). The batch interval data is determined based on the computational resource data. In an aspect, the batch interval data can be an input variable for the machine learning process. In an embodiment, the batch interval data can be determined based on the processing data of the computational resource data. Additionally or alternatively, the batch interval data can be determined based on the memory data of the computational resource data. Additionally or alternatively, the batch interval can be determined based on the network data of the computational resource data. In an embodiment, the batch interval data can be determined based on one or more patterns associated with the data collected for the machine learning process.

At 806, the batch interval data is provided, by the system (e.g., by machine learning component 108), to the group of computing devices to facilitate execution of the machine learning process based on the batch interval data. For example, the machine learning process associated with the group of computing devices can receive the batch interval data and can employ the batch interval data during execution of the machine learning process associated with the group of computing devices.

Figure 9:
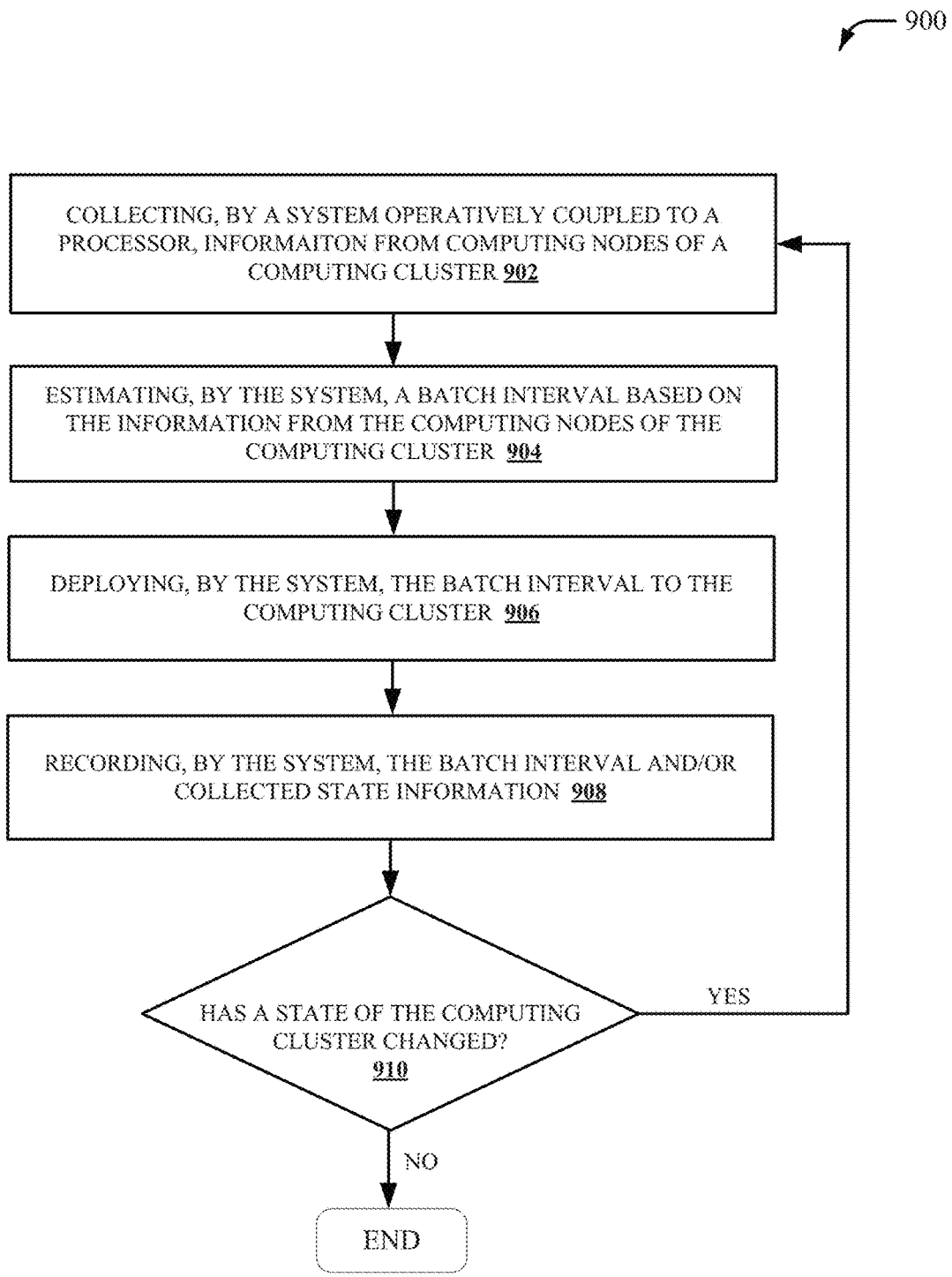
FIG. 9 illustrates a flow diagram of another example, non-limiting computer-implemented method for facilitating machine learning optimization in accordance with one or more embodiments described herein.

FIG. 9 illustrates a flow diagram of an example, non-limiting computer-implemented method 900 that facilitates machine learning optimization in accordance with one or more embodiments described herein. At 902, information from computing nodes of a computing cluster is collected by a system operatively coupled to a processor (e.g., by computational resource component 104). In an aspect, the computing nodes of the computing cluster can perform one or more machine learning processes. The information can be, for example, computational resource data that includes resource data, target algorithm data, data reach pattern data and/or latency requirement data. The resource data can include information associated with one or more resources for the computing nodes of the computing cluster. For instance, the resource data can include information associated with one or more processors (e.g., one or more central processing units) from the computing nodes of the computing cluster, memory from the computing nodes of the computing cluster, data storage from the computing nodes of the computing cluster, network bandwidth of the computing nodes of the computing cluster, and/or other computational resources from the computing nodes of the computing cluster. In an example, the resource data can include processing data indicative of processing information from one or more processors associated with the computing nodes of the computing cluster. In another example, the resource data can include memory data indicative of memory information from one or more memory devices associated with the computing nodes of the computing cluster. In yet another example, the resource data can include network data indicative of network bandwidth information associated with the computing nodes of the computing cluster.

The target algorithm data can include information associated with one or more target algorithms that are employed to determine the resource data. The one or more target algorithms can be one or more machine learning algorithms that are employed to determine the resource data. In one example, the target algorithm data can include a type of algorithm being employed to determine the resource data. In another example, the target algorithm data can include timing data associated with the algorithm being employed to determine the resource data. For instance, the target algorithm data can include an amount of time that the algorithm takes to execute one or more tasks associated with determining the resource data. The data reach pattern data can include one or more patterns associated with data obtained by the algorithm that determines the resource data. For example, the data reach pattern data can include information regarding how often data is collected by the algorithm that determines the resource data. In another example, the data reach pattern data can include a number of features associated with the data that is collected by the algorithm that determines the resource data. In yet example, the data reach pattern data can include information regarding a size of data collected by the algorithm that determines the resource data. The latency requirement data can include one or more latency requirements for the algorithm that determines the resource data. For example, latency requirement data can include a maximum latency allowed by the algorithm that determines the resource data.

At 904, a batch interval is estimated, by the system (e.g., by batch interval component 106), based on the information from the computing nodes of the computing cluster. The batch interval can be, for example, an interval of time for the one or more machine learning processes executed by the computing nodes of the computing cluster. In one example, the batch interval can be indicative of a time interval to collect data for the one or more machine learning processes executed by the computing nodes of the computing cluster.

At 906, the batch interval is deployed, by the system (e.g., by machine learning component 108), to the computing cluster. For example, the batch interval can be provided to the one or more machine learning processes executed by the computing nodes of the computing cluster. In an aspect, the one or more machine learning processes can be provided as an input variable for one or more machine learning processes. For instance, the batch interval can indicate to the one or more machine learning processes a time interval to collect data associated with the one or more machine learning processes.

At 908, the batch interval and/or collected state information is recorded by the system (e.g., by historical estimation database 202). For example, the batch interval can be stored in a database. Additionally or alternatively, state information for the computing nodes of the computing cluster can be collected and/or stored in the database in response to the batch interval being employed by the one or more machine learning processes executed by the computing nodes of the computing cluster.

At 910, it is determined whether a state of the computing cluster has changed. If yes, the computer-implemented method 800 returns to 902. If no, the computer-implemented method 800 ends.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least determining computational resource data and/or determining batch interval data are established from a combination of electrical and mechanical components and circuitry, a human is unable to replicate or perform processing performed by the optimization component 102 (e.g., the computational resource component 104, the batch interval component 106, and/or the machine learning component 108) disclosed herein. For example, a human is unable to determine computational resource data associated with one or more computing devices. Furthermore, a human is unable to optimize batch interval data for one or more computing devices.

Figure 10:
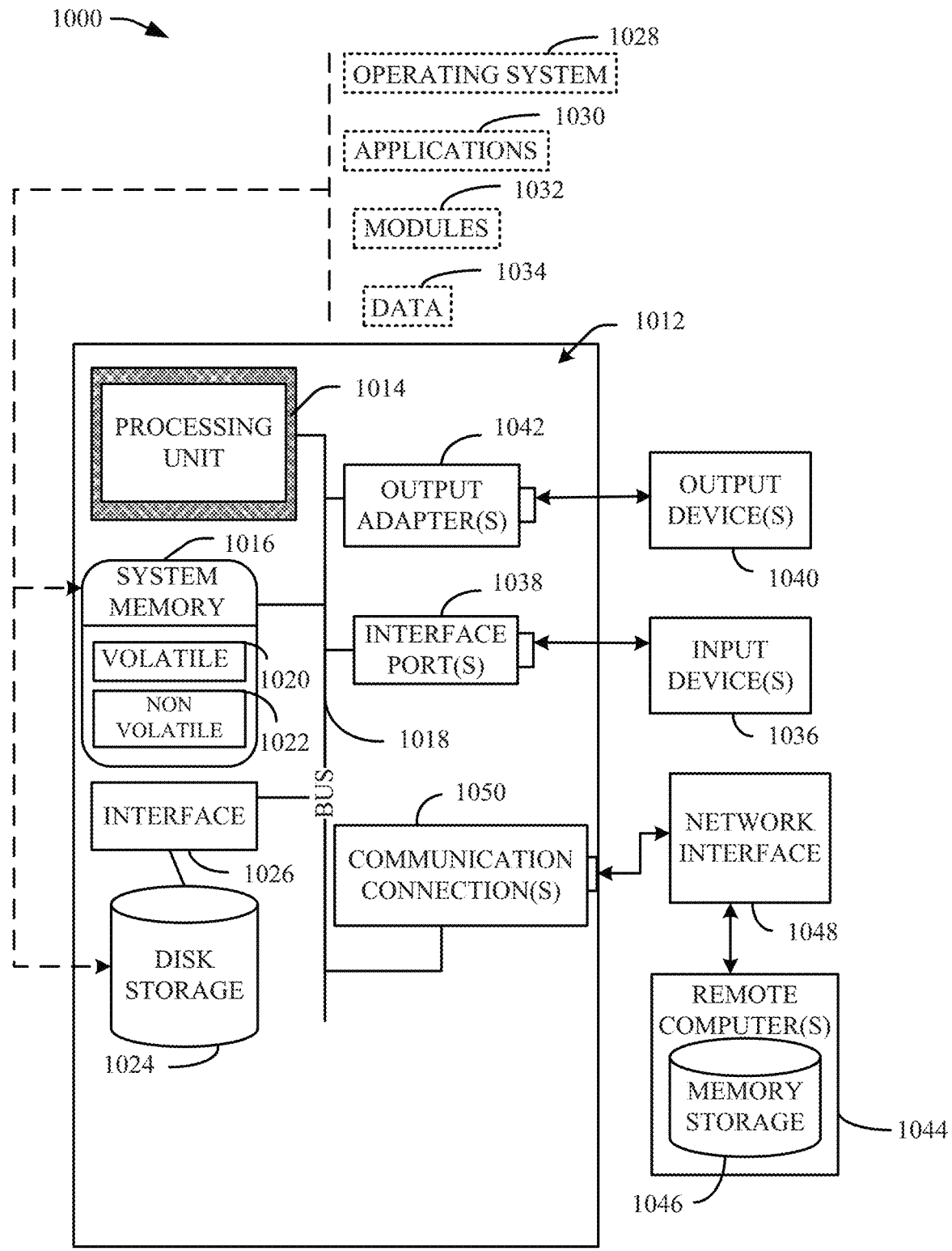
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
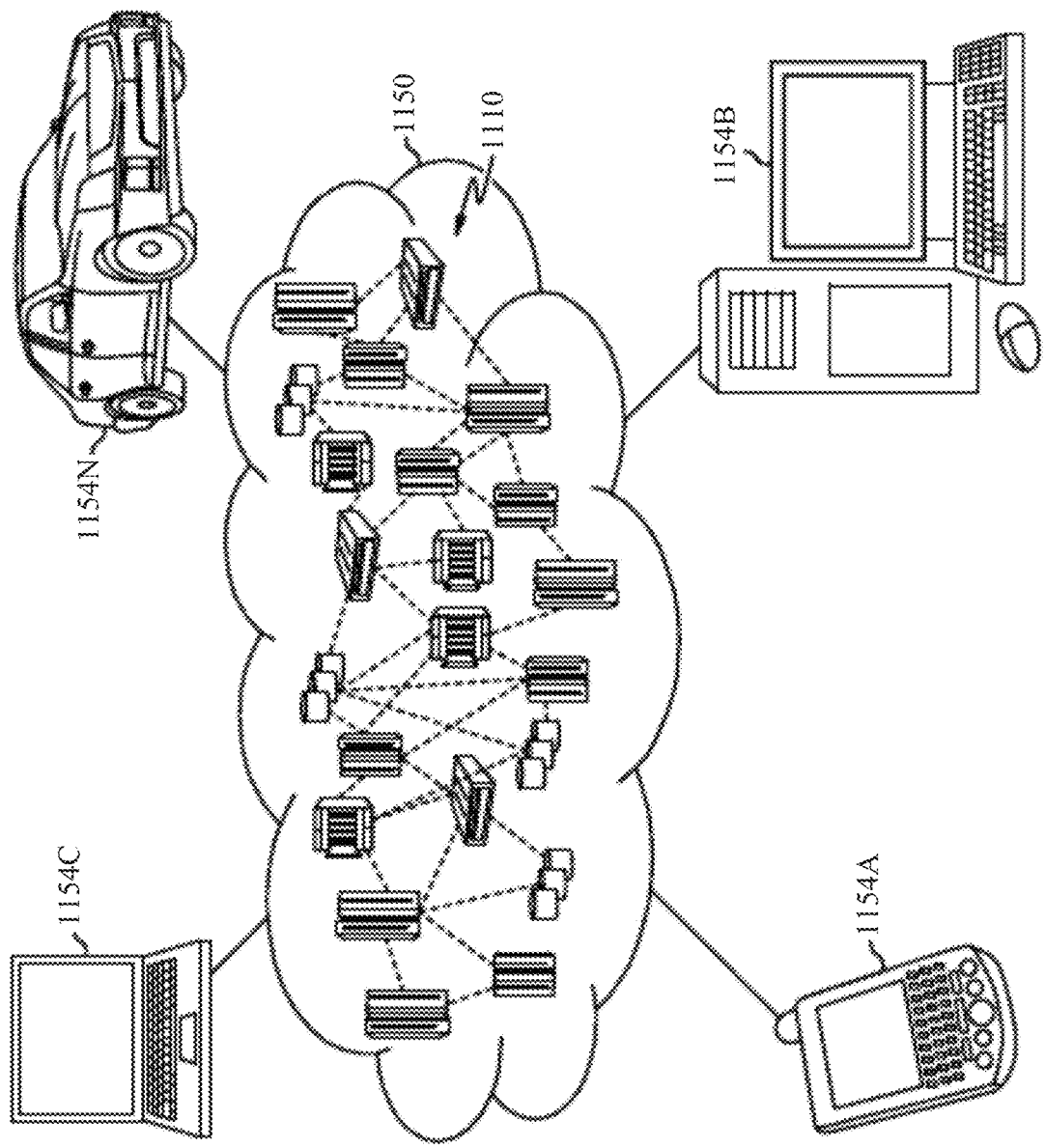
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
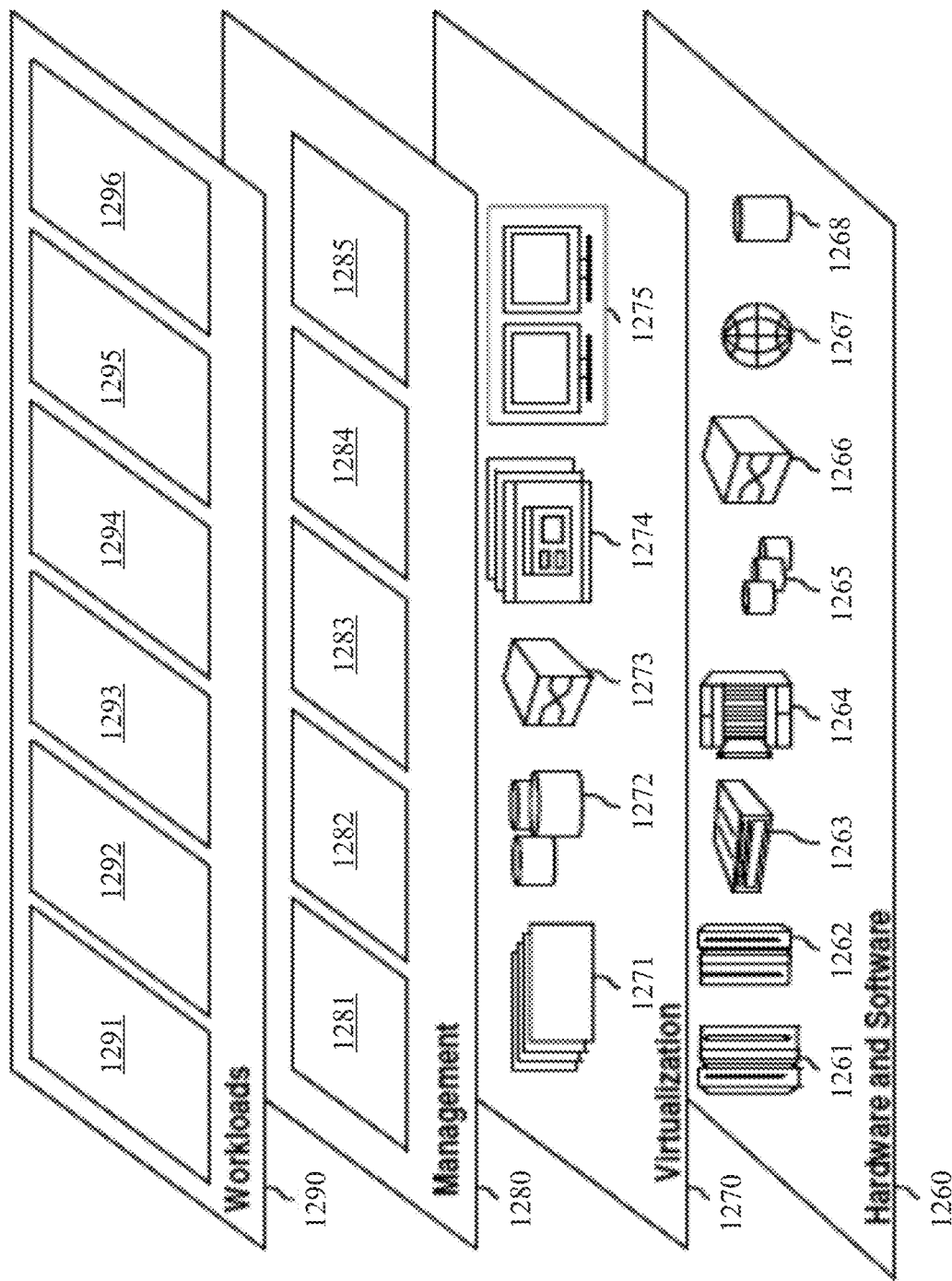
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and batch interval optimization software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a memory that stores computer executable components;
 a processor that executes the computer executable components stored in the memory, wherein the computer executable components comprise:
  a computational resource component that collects computational resource data associated with a group of computing devices that performs a machine learning process associated with batch learning, wherein the computational resource data comprises:
   respective resource data of computing devices of the group of computing devices,
   target algorithm data that identifies, from a group of algorithms, respective types of respective algo- rithms that were employed to determine the respective resource data;
respective states of the computing devices; and
respective amounts of execution time that the respective algorithms having the respective types took to determine the respective resource data based on the respective states of the computing devices;
a batch interval component that determines, based on the computational resource data and one or more changes to the respective states of the computing devices, a first batch interval defining a time interval to collect input data for the machine learning process; and
a machine learning component that provides the first batch interval to the group of computing devices to facilitate execution of the machine learning process based on the batch interval; and
wherein the batch interval component determines a second batch interval defining an updated time interval to collect the input data for the machine learning process in response to a control signal received from an electronic device that monitors the group of computing devices.

2. The system of claim 1, wherein the respective resource data comprises processing data indicative of processing information from a group of processors associated with the group of computing devices that performs the machine learning process, and wherein the batch interval component determines the first batch interval based on the processing data.

3. The system of claim 1, wherein the respective resource data comprises memory data indicative of memory information from a group of memory devices associated with the group of computing devices that performs the machine learning process, and wherein the batch interval component determines the first batch interval based on the memory data.

4. The system of claim 1, wherein the respective resource data comprises network data indicative of network bandwidth information associated with the group of computing devices that performs the machine learning process, and wherein the batch interval component determines the first batch interval based on the network data.

5. The system of claim 1, wherein the batch interval component determines the second batch interval based further on a determination that the group of computing devices satisfy a defined criterion.

6. The system of claim 1, wherein the batch interval component determines the first batch interval further based on one or more patterns associated with historical input data collected for the machine learning process.

7. The system of claim 1, wherein the batch interval component determines the first batch interval further based on latency data indicative of a set of latency requirements for the group of computing devices.

8. The system of claim 1, wherein the batch interval component determines the first batch interval based on the computational resource data and historical data associated with the group of computing devices.

9. The system of claim 1, wherein the batch interval provides improved processing performance for the group of computing devices.

10. A computer-implemented method, comprising:
collecting, by a system operatively coupled to a processor, computational resource data associated with a group of computing devices that performs a machine learning process associated with batch learning, wherein the computational resource data comprises:
respective resource data of computing devices of the group of computing devices,
target algorithm data that identifies, from a group of algorithms, respective types of respective algorithms that were employed to determine the respective resource data;
respective states of the computing devices; and
respective amounts of execution time that the respective algorithms having the respective types took to determine the respective resource data based on the respective states of the computing devices;
determining, by the system based on the computational resource data and one or more changes to the respective states of the computing devices, a first batch interval defining a time interval to collect input data for the machine learning process;
providing, by the system, the first batch interval to the group of computing devices to facilitate execution of the machine learning process based on the batch interval; and
determining, by the system, a second batch interval defining an updated time interval to collect the input data for the machine learning process in response to a control signal received from an electronic device that monitors the group of computing devices.

11. The computer-implemented method of claim 10, wherein the respective resource data comprises processing data indicative of processing information from a group of processors associated with the group of computing devices that performs the machine learning process.

12. The computer-implemented method of claim 10, wherein the respective resource data comprises memory data indicative of memory information from a group of memory devices associated with the group of computing devices that performs the machine learning process.

13. The computer-implemented method of claim 10, wherein the respective resource data comprises network data indicative of network bandwidth information associated with the group of computing devices that performs the machine learning process.

14. The computer-implemented method of claim 10, wherein the determining the first batch interval comprises determining the first batch interval further based on one or more patterns associated with historical input data collected for the machine learning process.

15. The computer-implemented method of claim 10, wherein the determining the first batch interval comprises determining the first batch interval further based on latency data indicative of a set of latency requirements for the group of computing devices.

16. The computer-implemented method of claim 10, wherein the providing the first batch interval to the group of computing devices comprises improving the machine learning process performed by the group of computing devices.

17. A computer program product facilitating machine learning, the computer program product comprising a non-transitory computer readable medium having program instructions embodied therewith, the program instructions executable by a processor to cause the processor to:
collect, by the processor, computational resource data associated with a group of computing devices that performs a machine learning process associated with batch learning, wherein the computational resource data comprises:
respective resource data of computing devices of the group of computing devices, and target algorithm data that identifies, from a group of algorithms, respective types of respective algorithms that were employed to determine the respective resource data;

respective states of the computing devices; and respective amounts of execution time that the respective algorithms having the respective types took to determine the respective resource data based on the respective states of the computing devices;

determine, by the processor, based on the computational resource data and one or more changes to the respective states of the computing devices, a first batch interval, wherein the batch first interval defines a time interval to collect input data for the machine learning process;

modify, by the processor, the machine learning process performed by the group of computing devices based on the first batch interval; and determine, by the processor, a second batch interval defining an updated time interval to collect the input data for the machine learning process in response to a control signal received from an electronic device that monitors the group of computing devices.

18. The computer program product of claim 17, wherein the respective resource data comprises processing data indicative of processing information from a group of processors associated with the group of computing devices that performs the machine learning process.

19. The computer program product of claim 17, wherein the respective resource data comprises memory data indicative of memory information from a group of memory devices associated with the group of computing devices that performs the machine learning process.

20. The computer program product of claim 17, wherein the respective resource data comprises network data indicative of network bandwidth information associated with the group of computing devices that performs the machine learning process.

* * * * *